Figure 1:
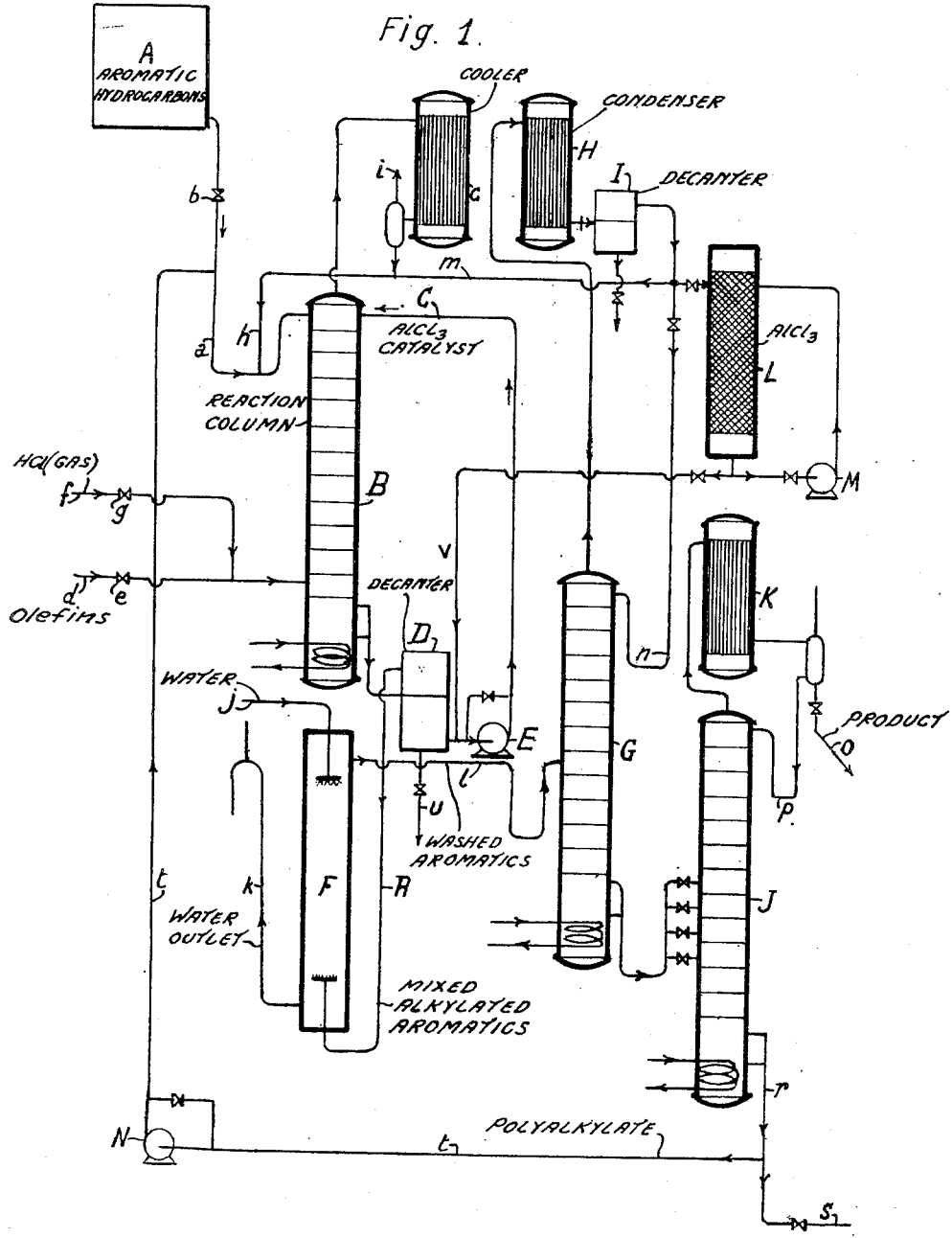

April 24, 1951   A. GISLON   2,550,413
ALKYLATION PROCESS
Filed Dec. 15, 1945   3 Sheets-Sheet 1

INVENTOR
André Gislon
BY
Blair, Curtis & Hayward
ATTORNEYS

Patented Apr. 24, 1951

2,550,413

UNITED STATES PATENT OFFICE 2,550,413

ALKYLATION PROCESS

André Gislon, Paris, France, assignor to Compagnie Française de Raffinage (Societe Anonyme), Paris, France, a company of the French Republic Application December 15, 1945, Serial No. 635,243
In France December 18, 1943

Section 1, Public Law 690, August 8, 1946
Patent expires December 18, 1963

5 Claims. (Cl. 260—671)

This invention relates to processes for alkylation of aromatic hydrocarbons and particularly to improvements in the efficiency of production of particular aromatic hydrocarbons by means of a Friedel-Crafts reaction between the aromatic hydrocarbon and olefines.

A known method for the alkylation of aromatic hydrocarbons with olefines and more particularly with gaseous olefines consists in executing it under normal temperature and pressure conditions in presence of catalysts of the Friedel-Craft type. This reaction leads always to the production of a mixture of mono-alkylated and polyalkylated derivatives; such in particular is the case of the synthesis of monoethylbenzene.

I have found that when it is desired to apply known methods such for instance as the method described in the U. S. Patent Specification 2,222,012, the percentage of polyalkylated products with reference to the monoalkylated product which is the only interesting product, is such that it prevents the method from having any commercial interest.

I have attempted to improve this method by reduction in the proportion of polyalkylated products.

I have found in the first place that the proportion of polyalkylated products increases with the ageing of the catalyst; thus the alkylation of benzene with ethylene in presence of aluminium chloride when carried on to a complete exhaustion of the catalyst at the temperature of 83° C. produces the following results:

*Table 1*

| Age of the catalyst | Composition of the crude alkylated product | |
|---|---|---|
| | Mono alkyl-benzene | Polyalkyl-benzene |
| | Per cent | Per cent |
| 0-3 hours | 85 | 15 |
| 3-6 hours | 80 | 20 |
| 6-9 hours | 64 | 36 |

If the alkylated products are not separated during the reaction, after 9 hours the accumulated alkylated products contain only 64% of monoalkylbenzenes.

I have found in the second place that the polysubstituted derivatives are formed all the more easily when the concentration of the monoalkylated product increases in the mixture undergoing reaction.

These observations have led me to separate the monoalkylated products as they are being formed without leaving them in contact with the catalyst until the latter is exhausted.

In the third place I have found that the proportion of polyalkylated compounds increases when the reaction temperature falls. Thus, all other factors remaining invariable, there is observed:

*Table 2*

| Temperature of reaction | Proportion of monoalkylbenzene with reference to the total alkylated derivatives |
|---|---|
| ° C. | Per cent |
| 45 | 53 |
| 65 | 67 |
| 85 | 77 |

It is therefore of interest to operate at high temperature and for the adjustment of the latter it is preferable to apply boiling temperature.

I have also found that by recycling the polyalkylated products obtained in prior operations it is possible to improve the yield of monoalkylated products, provided the temperature of operation is sufficiently high as illustrated by the examples of the following table 3 which shows the results obtained with different proportions of the mixture at different temperatures.

*Table 3*

| | I | II | III | IV |
|---|---|---|---|---|
| Mixture: | | | | |
| benzene | 100 | 90 | 90 | 100 |
| polyethylbenzene | 0 | 10 | 10 | 0 |
| Temperature °C | 83 | 83 | 65 | 65 |
| Mol. C$_2$H$_4$ / Mol. C$_6$H$_6$ | 0.43 | 0.39 | 0.39 | 0.33 |
| Weight C$_6$H$_6$ transformed / Weight C$_6$H$_6$ used percent | 39 | 39 | 21 | 25 |
| Monoalkylbenzene / Total alkylbenzene do | 77 | 86 | 62 | 67 |
| Benzene under the form of monoethylbenzene / Total alkylated benzene do | 79 | 87 | 78 | 74 |
| Ethylene under the form of monoethylbenzene / Total combined ethylene do | 72 | 87 | 40 | 54 |

It is apparent by referring to the two last lines of the above tables that at low temperatures the ratio of transformation of the benzene does not increase greatly but that the ratio of transformation of the ethylene is considerably reduced by reason of the formation of a high proportion of hexaethylbenzene. When high yield of monoalkyl benzene is desired, the recycling should therefore be executed at a high temperature and so should the reaction itself and the conditions of preparation should be such that it may be possible to adjust as desired the percentage of recycled polyalkylbenzene so as to obtain the maximum efficiency consistent with the mean life of the catalyst considered.

The method corresponding to the invention is thus characterized by the following features:

a The operation is executed at the boiling temperature of the mixture of alkylated substances obtained in an immediate manner; it is moreover possible to make this temperature vary through the use of solvents or through a modification in the pressure applied or an adjustment of the excess of benzene.

b The products pass through the reaction zone in a comparatively short time as compared with the life of the catalyst when used for discontinuous operation.

c The alkylated products are immediately separated from the polyalkylated products which are recycled at least partly.

The above features of the invention may be applied in practice in a particularly favorable manner in accordance with the modus operandi and with the apparatus described in the prior French patent applications, provisional Number 474,578, dated December 19, 1942, for "Improvements to a Method of Synthesis" and provisional Number 478,289, dated April 16, 1943, for "Method of Manufacture of Oily Products."

These features of the invention are illustrated under the form of practical forms of execution and by way of examples in accompanying drawings.

Figure 2:
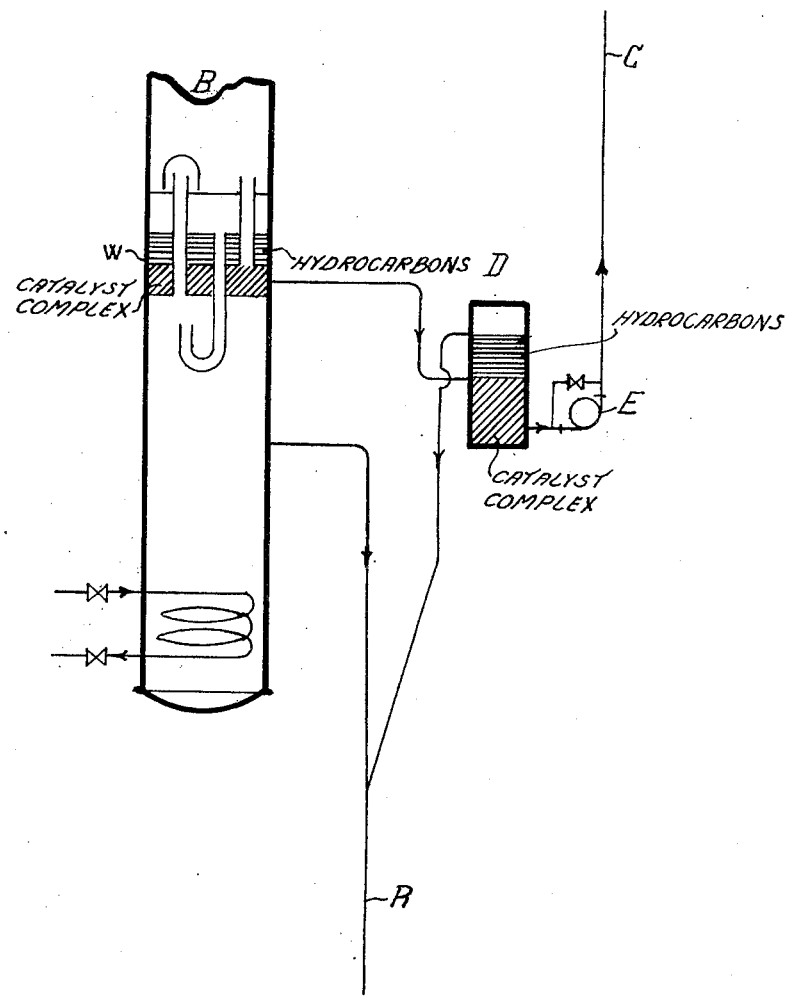
Figure 3:
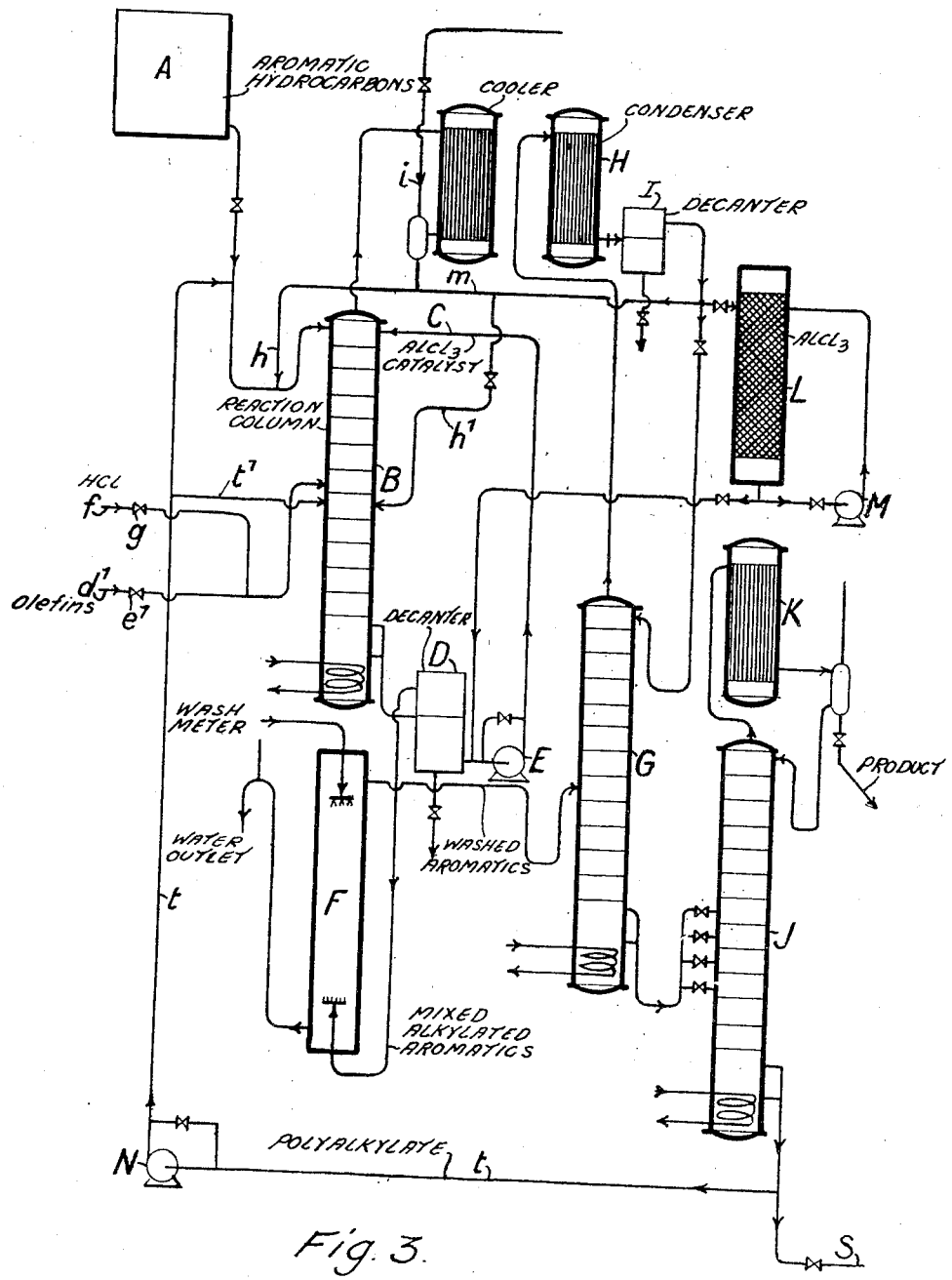

In said drawings, Fig. 1 is a general diagram of a plant for execution of my invention, Fig. 2, is a partial diagrammatic showing of a detail modification and Fig. 3 is a further modification of Fig. 1.

In Fig. 1, the aromatic hydrocarbon contained in the loading vat A is admitted through the syphon a to the head of the reaction column B at a speed adjusted by the valve b, together with the catalyst such as a compound of hydrocarbon with AlCl3, which is admitted through the pipe C. The olefine or the gaseous mixture containing same is introduced at the bottom of the column B through the pipe d at a speed which is adjusted by the valve e and if it is required it is admixed with gaseous hydrochloric acid admitted through the pipe f under amounts measured and adjusted by the valve g. In the column B the temperature is automatically adjusted by the boiling of the liquids; the olefine flows in counter-current relationship with the aromatic hydrocarbon and the catalyst and forms alkylated derivatives which collect at the lower end of the column, creating thereby a temperature which increases gradually from top to bottom and furthers maximum formation of the monoalkylated derivatives. The proportion of hydrocarbon and catalyst is adjusted together with the introduction of olefine so as to obtain at the lower end of the column the desired concentration of the alkylated derivative and at the upper end thereof an exhaustion as complete as possible of the olefine. At the head of the column is provided the cooler c for the separation between the hydrocarbon and the non-combined gases which escape through the pipe i and may be then submitted to any useful washing for the recovery of the hydrocarbons carried away by them. The hydrocarbon is recycled through the pipe h.

At the lower end of the column B the crude mixture of the catalyst, the untransformed hydrocarbon and its alkylated derivatives is separated in the decanting vessel D and cooled if required for reducing the solubility of the complex catalyst product. The latter which separates so as to form a lower layer is recycled in the reaction circuit through the pump E and the pipe C. The mixture of aromatic hydrocarbons forming the upper layer is directed through the pipe R into the column F inside which it is washed and wherein it flows in counter-current relationship with the water admitted through the pipe j; the washing water is removed through the pipe k while the hydrocarbon, washed and freed of any traces of the catalyst carried away with it is admitted through the pipe l into the fractionating column G. At the upper end of the latter is provided a condenser H providing for the condensation; the untransformed hydrocarbon is separated through decantation in the vessel I from the small amount of water carried away during the passage through the washing column F and which is separated under the form of an azeotropic mixture in the column G. The hydrocarbon is returned from I through the pipe m into the reaction column B and a small amount thereof is returned to the head of the column G through the syphon n for furthering the separation of the vapors. From the lower end of the column G is removed a mixture of alkylated derivatives which is fractionated inside the column J; at the upper end of the latter is obtained the pure monoalkylated product which condenses at K and is removed through the pipe o with a partial recycling into the column J through the pipe p. At the lower end of the column J are removed through the pipe r the polyalkylated derivatives which may be extracted partly through the pipe S, the remainder being returned into the reaction column B through the pipe t and the pump N. The exhausted catalyst may be removed either periodically or in a continuous manner from D through the pipe u and submitted to hydrolysis in view of the extraction of the alkylated derivatives which are returned for separation inside the column G. It is then replaced through the admission through the pipe v of fresh catalyst obtained for instance through the flowing of benzene, over aluminium chloride inside the column L, which flowing is ensured by the pump M or any equivalent means. It is possible to adjust the temperature of reaction in the column B by making the pressure therein vary. The principle underlying the invention is not modified by operating in presence of solvents.

There is no interest in superheating the catalyst in the lower portion of the column B in contact with reaction products; for this reason the diagrammatic showing described may be improved by adopting the arrangement illustrated in Fig. 2.

At the lower end of the reaction column B the decantation of the complex catalyst is executed chiefly inside a deep cup w. The lower layer is then admitted if required inside an auxiliary decanting vessel D after which the pump E forces the catalyst into the pipe C and then into the reaction column B; the mixture of alkylated derivatives passing out of the lower end of the reaction column B and out of the decanting vessel D is then sent through the pipe R to the washing column F which leads it to distillation.

Of course it is possible to modify in various manners this form of execution and this apparatus without departing from the scope of the invention and if required its advantages may be more or less reduced thereby.

It is possible for instance to replace the plate column B by a reaction vat provided or not with stirring means, the remainder of the connections remaining unchanged. This results however in a loss of the advantage of classification of the polyalkylated compounds inside the column.

I may also substitute for the column B a counter-current contact column such as that illustrated in above mentioned United States specification 2,222,012. In this case even if the operation is executed at a high temperature, for instance under pressure, the benefit of self-regulation through boiling is lost but all the other benefits of the present invention are retained, particularly, the non-recycling of the monoalkylated product and the adjustable recycling of the polyalkylated product.

My invention covers also an improvement of the above method which improvement is particularly advantageous in the case of alkylation of benzene with propylene or butylene and through which it is possible to still further reduce the proportion of polyalkylbenzene.

The alkylated products obtained as by-products in the above described reaction such as those obtained at S in Fig. 1 may be taken up again with an excess of benzene in presence of a further amount of catalyst of the same type, but this leads to additional consumption of catalyst. On the other hand the recycling in the zone of alkylation itself improves the yield it is true but does not do away with the formation of further amounts of polyalkylated products; this recycling should therefore be only partial.

Now I have found also that in the case of the alkylation of benzene with olefines higher than ethylene, the alkylation is performed more advantageously at ordinary temperature. On the contrary, the transformation of the polyalkylated derivatives becomes effective at high temperature say at boiling temperature.

Therefore, if the polyalkylated derivatives are recycled into the reaction mixture for cold alkylation, it is found that there are produced fresh amounts of polyalkylated derivatives substantially as if no recycling had taken place. If on the contrary the recycling is executed into a reaction mixture for hot alkylation it is found that the activity of the catalyst decreases much more rapidly and this results in a further formation of polyalkylated derivatives which is caused precisely by the ageing of the catalyst and can be checked only through the use of more considerable amounts of said catalyst.

I have also found that the total recycling of the polyalkylated derivative is possible and efficient if the operation is executed in two separate stages in the following manner:

A mixture of aromatic hydrocarbons and of polyalkylated derivatives which it is desired to recycle is submitted to the action of the olefine in the presence of suitable amounts of a catalyst of the Friedel and Crafts type, for instance $AlCl_3$ at ordinary temperature and preferably while avoiding any rise in temperature through a judicious elimination of the calories evolved by the reaction (which is strongly exothermic).

After combining the desired amount of olefine, the mixture is brought to boiling point and then submitted to distillation after hydrolysis of the aluminium chloride; the excess of untransformed aromatic hydrocarbon is thus recovered together with the mixture of mono and polyalkylated derivatives. If the amount of polyalkylated derivatives used and the amount of olefine combined are suitable and correspond to the equilibrium of the product at the end of the reaction, it will be noticed that all the combined olefine is transformed into monoalkylated derivatives so that the amount of polyalkylated substances used at the beginning of the reaction is recovered at the end of the reaction without any increase in amount.

According to a modification of the method which also leads to good results, I may execute the alkylation in the absence of any polyalkylated derivatives when cold; after absorption of the desired amount of the olefine, I add the polyalkylated substances to be recycled and cause the mixture to boil. Under these conditions, the polyalkylated substances formed in a first stage are transformed into monoalkylated substances and there is only found at the end of the reaction the polyalkylated substances added during the second stage and intended for a further recycling.

The advantages of the method appear clearly from the following tables wherein are comparatively summarised the results of my numerous experiences relating to the alkylation of benzene with butylene.

In said tables, the column A gives the proportion of polyalkylated substances to the monoalkylated substances formed and the column B the consumption of $AlCl_3$ for each hundred kilogrammes of the monoalkylated substances.

| | A | B |
|---|---|---|
| | | Per cent |
| Alkylation without any recycling at ordinary temperature | 0.925 | 1.44 |
| Alkylation without any recycling at 85–90° C | 0.365 | 1.88 |
| Alkylation without any recycling executed in the cold, separation of the polyalkylated substances and transformation of the latter in a separate operation | 0.033 | 4.7 |
| Alkylation with recycling of the polyalkylated substances at ordinary temperature | 0.258 | 3.07 |
| Alkylation with recycling of the polyalkylated substances at 85°–90° C | 0.287 | 3.09 |
| Alkylation with recycling in the cold and heating to 85° C.–90° C | 0 | 1.80 |
| Alkylation without recycling in the cold, recycling and heating at 85°–90° C | 0 | 1.70 |

The invention is applicable in a discontinuous or continuous process to olefine which may be pure or diluted in saturated hydrocarbons or inert gases as obtained through cracking of petroleum products under ordinary pressure or a higher pressure.

Although there are given below certain specific examples of this invention and its application and practical use and certain modifications and alternatives are suggested, it is to be understood that they are not intended to be exhaustive or limiting of the invention, but on the contrary they are given in order to acquaint others skilled in the art with the invention and principles thereof so fully that they may be enabled to modify the invention and to adapt it and apply it in numerous forms and under various conditions each as may be best suited to the requirements of a particular use.

*Example 1.*—A vat of 300 litres is loaded with 109 kg. of benzene, 20.1 kg. of polybutylbenzene produced by a prior operation and 1 kg. of anhydrous aluminium chloride and the mixture is caused to absorb at room temperature 24.9 kg. of butylene. The absorption is complete in 35 minutes. The mixture is then brought to boiling point during 15 minutes, it is washed with water and dried through azeotropic distillation and finally rectified. I obtain thus:

74.3 kg. of untransformed benzene
59.6 kg. of monobutylbenzene
20.1 kg. of polybutylbenzene which may be recycled in a further operation.

This leads to a quantitative transformation into monobutylbenzene of the butylene used and of the benzene which has reacted. The consumption of catalyst is 1.68 kg. of AlCl₃ for each 100 kg. of monobutylbenzene formed.

*Example 2.*—100 kg. of benzene are alkylated in presence of 0.92 kg. of AlCl₃ with 22.7 kg. of butylene at ordinary temperature. I add then 18.4 kg. of polybutylbenzene to be recycled and the mixture is heated at boiling point during 15 minutes.

After washing and drying, I find after rectification:

68.9 kg. of untransformed benzene
53.8 kg. of monobutylbenzene
18.4 kg. of polybutylbenzene to be recycled.

*Example 3.*—A reaction vat containing 100 useful litres is connected with a gasometer filled with butylene and is fed in a continuous manner at the rate of 96 kg. per hour with a mixture containing 84.5% of benzene and 15.5% of polybutylbenzene to be recycled and holding in suspension 740 gr. of anhydrous aluminium chlorine. The vat being held at ordinary temperature, there are absorbed 18.5 kg. per hour of butylene. The reaction product is removed in a continuous manner and brought to 93° C. during 15 minutes in a simple worm heated with steam after which the product is washed in water in a continuous manner, and distilled. There are obtained thus 44 kg. per hour of monobutylbenzene, 15 kg. per hour of polybutylbenzene, 55.5 kg. per hour of benzene, these two latter derivatives being recycled after addition of 25.5 kg. per hour of fresh benzene.

*Example 4.*—This example which is a direct modification of the arrangement shown diagrammatically in Fig. 1 is illustrated in Fig. 3 which reproduces Fig. 1 with its chief reference letters and shows the characteristic modifications of the last improvement disclosed.

The two stages of reactions are executed in the same column B which includes of course a somewhat larger number of plates. The two zones are distinguished by the fact that the olefine admixed, if desired, with HCl, instead of entering the lower end of the column enters the medial part thereof through the pipe d' provided with a valve e'. The benzene enters partly the column B through the pipe h as in the case of Fig. 1, but it may also enter partly the medial portion of the column B through the pipe h'.

In the upper part of this column B is maintained a third constituent or diluent having a very low boiling point which may be for instance butane. The proportions and the recycling are adjusted in such a manner that this third constituent touches only the plates of the upper portion of the column; a temperature approximating for instance 30° C. will be adopted for the upper plate.

Under such conditions, the alkylation is produced at room temperature in the upper part of the column B and the transformation of the poly- alkylated products into monoalkylated products is obtained on the contrary in the lower portion of the column which is kept at a temperature of the order of 90° C. The polyalkylbenzenes are returned entirely into the column B through the pipe t and they may be returned into B either directly to the head thereof or else into its medial portion through the branch pipe t'. No change is brought to the remainder of the apparatus. It will be noticed that this form of execution is particularly interesting when instead of feeding the column B with butylene, it is fed with a mixture of butane and butylene. Under such conditions, as a matter of fact, the butane will collect at the upper part of the column B where it plays the part of a third body. But it will be necessary to remove in a continuous manner an amount of butane equal to that contained in the feed so as not to disturb the equilibrium. This excess of butane is removed in the state of vapor and in a continuous manner, for instance through the pipe i.

What I claim is:

1. A method for alkylating benzene to yield a high proportion of monoalkylate to polyalkylate which comprises establishing and maintaining an elongated reaction zone, supplying liquid-phase Friedel-Crafts type catalyst and liquid benzene to an upper portion of the zone, maintaining said upper portion of the zone at the boiling temperature of the liquid reaction mixture therein, supplying a normally gaseous monolefin to a lower portion of said zone, passing said olefin upwardly through said zone to react with said benzene and yield a liquid reaction mixture containing monoalkylate and polyalkylate as well as unreacted liquid, conducting said liquid reaction mixture from the upper portion of the zone to the lower portion of the zone, maintaining the lower portion of the reaction zone at the boiling temperature of the liquid reaction mixture therein, passing hot vapors yielded in the lower portion of the zone to the upper portion of the zone, and removing liquid reaction mixture from the zone.

2. A method according to claim 1 with the additional steps of separating catalyst from the liquid reaction mixture removed from the reaction zone, and recycling separated catalyst to an upper portion of said reaction zone.

3. A method according to claim 1 with the additional steps of separating polyalkylate from the reaction mixture removed from the zone, and recycling separated polyalkylate to said reaction zone.

4. A method of alkylating benzene with a normally gaseous mono-olefin to yield a high proportion of monoalkylate to polyalkylate which comprises reacting liquid benzene with a normally gaseous olefin in the presence of a liquid-phase Friedel-Crafts type catalyst in a first reaction zone, maintaining said first reaction zone at a relatively low temperature, thereby yielding a liquid reaction mixture containing monoalkylate and polyalkylate, passing said liquid reaction mixture to a second reaction zone, maintaining said second reaction zone at the boiling temperature of the reaction mixture, conducting vapors evolved in the second reaction zone to said first reaction zone, recycling catalyst from the second zone to the first zone, and maintaining the catalyst age at an average value substantially less than its full period by replacing portions of catalyst in said reaction zones with fresh catalyst.

5. A method according to claim 4 wherein polyalkylate is separated from the reaction mixture in the second zone and recycled to the first zone.

ANDRÉ GISLON.

REFERENCES CITED

The following references are of record in the file of this patent:

UNITED STATES PATENTS

| Number | Name | Date |
|---|---|---|
| 1,953,702 | Davidson | Apr. 3, 1934 |
| 2,338,711 | D'Ouville et al. | Jan. 11, 1944 |
| 2,364,203 | Francis et al. | Dec. 5, 1944 |
| 2,373,062 | Stahly | Apr. 3, 1945 |
| 2,385,187 | Blanding | Sept. 18, 1945 |
| 2,388,758 | Mills, Jr. | Nov. 13, 1945 |
| 2,400,437 | Perkins et al. | May 14, 1946 |

OTHER REFERENCES

Natelson: "Styrene and Metastyrene," Ind. Eng. Chem., vol. 25, No. 12 (December 1933), pages 1391-2-3-4-5 (5 pages).